United States Patent
Seo et al.

(10) Patent No.: US 10,448,402 B2
(45) Date of Patent: *Oct. 15, 2019

(54) METHOD AND APPARATUS FOR AGGREGATING CARRIERS IN WIRELESS COMMUNICATION SYSTEMS

(71) Applicant: LG ELECTRONICS INC., Seoul (KR)

(72) Inventors: Dongyoun Seo, Anyang-si (KR);
Bonghoe Kim, Anyang-si (KR);
Joonkui Ahn, Anyang-si (KR);
Suckchel Yang, Anyang-si (KR);
Hanbyul Seo, Anyang-si (KR);
Seungmin Lee, Anyang-si (KR);
Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,044

(22) Filed: Jun. 29, 2018

(65) Prior Publication Data
US 2018/0310315 A1 Oct. 25, 2018

Related U.S. Application Data

(63) Continuation of application No. 15/658,082, filed on Jul. 24, 2017, now Pat. No. 10,039,106, which is a
(Continued)

(51) Int. Cl.
*H04W 72/04* (2009.01)
*H04L 5/00* (2006.01)
(Continued)

(52) U.S. Cl.
CPC ........ *H04W 72/0453* (2013.01); *H04J 3/1694* (2013.01); *H04L 5/001* (2013.01);
(Continued)

(58) Field of Classification Search
CPC ...... H04J 3/1694; H04L 5/001; H04L 5/0055; H04L 5/0064; H04L 5/14; H04L 5/1469;
(Continued)

(56) References Cited

U.S. PATENT DOCUMENTS 9,019,871 B2 * 4/2015 Yang .................. H04L 5/0055
370/280
9,331,819 B2 * 5/2016 Si ............................ H04L 5/14
(Continued)

FOREIGN PATENT DOCUMENTS

CN 101431362 A 5/2009
CN 101926214 A 12/2010
(Continued)

OTHER PUBLICATIONS

ITRI: "Cross-carrier scheduling and HARQ timing for different TDD UL-DL configurations", R1-121700, 3GPP TSG RAN WG1 Meeting #68bis, Jeju Island, Korea, Mar. 26-30, 2012.
(Continued)

*Primary Examiner* — Robert J Lopata
(74) *Attorney, Agent, or Firm* — Dentons US LLP

(57) ABSTRACT

The present invention relates to a method and apparatus for aggregating carriers in wireless communication systems. In the method, a first carrier is set up, and a second carrier is added in addition to the first carrier. In addition, the first carrier is a time division duplex (TDD) carrier for which an uplink subframe and a downlink subframe are positioned at different times in a frame, and the second carrier is a carrier only for a downlink that consists of downlink subframes.

10 Claims, 14 Drawing Sheets

Related U.S. Application Data continuation of application No. 15/258,659, filed on Sep. 7, 2016, now Pat. No. 9,743,409, which is a continuation of application No. 14/390,315, filed as application No. PCT/KR2013/002887 on Apr. 5, 2013, now Pat. No. 9,462,587.

(60) Provisional application No. 61/636,740, filed on Apr. 23, 2012, provisional application No. 61/667,947, filed on Jul. 4, 2012, provisional application No. 61/702,214, filed on Sep. 17, 2012, provisional application No. 61/738,401, filed on Dec. 18, 2012, provisional application No. 61/750,316, filed on Jan. 8, 2013, provisional application No. 61/620,449, filed on Apr. 5, 2012.

(51) Int. Cl.
*H04L 5/14* (2006.01)
*H04J 3/16* (2006.01)
*H04W 76/10* (2018.01)

(52) U.S. Cl.
CPC .......... *H04L 5/0055* (2013.01); *H04L 5/0064* (2013.01); *H04L 5/14* (2013.01); *H04L 5/1469* (2013.01); *H04W 72/0406* (2013.01); *H04W 72/0446* (2013.01); *H04W 76/10* (2018.02)

(58) Field of Classification Search
CPC ......... H04W 72/0406; H04W 72/0446; H04W 72/0453; H04W 76/02
USPC ....................................................... 370/280
See application file for complete search history.

(56) References Cited

U.S. PATENT DOCUMENTS

| | | | |
|---|---|---|---|
| 2006/0077931 A1 | 4/2006 | Lee et al. | |
| 2008/0025236 A1 | 1/2008 | Jones | |
| 2011/0243012 A1 | 10/2011 | Luo et al. | |
| 2012/0113919 A1* | 5/2012 | Kone | H04W 52/146 370/329 |
| 2012/0257554 A1 | 10/2012 | Kim et al. | |
| 2013/0063707 A1 | 4/2013 | Wang | |
| 2013/0083707 A1* | 4/2013 | Wang | H04W 72/1289 370/280 |
| 2013/0195070 A1* | 8/2013 | Bashar | H04W 4/70 370/330 |
| 2013/0215823 A1* | 8/2013 | Shin | H04L 5/001 370/328 |
| 2013/0223296 A1* | 8/2013 | Zeng | H04L 5/0007 370/280 |
| 2013/0223301 A1* | 8/2013 | Lee | H04W 72/042 370/281 |
| 2013/0242816 A1* | 9/2013 | He | H04W 72/0413 370/280 |
| 2013/0286907 A1* | 10/2013 | Wei | H04L 5/001 370/281 |
| 2013/0294423 A1* | 11/2013 | Wang | H04N 21/2365 370/336 |
| 2014/0044000 A1* | 2/2014 | Charbit | H04W 16/14 370/252 |
| 2014/0071860 A1* | 3/2014 | Susitaival | H04W 52/0216 370/280 |
| 2014/0161002 A1* | 6/2014 | Gauvreau | H04L 1/1893 370/280 |
| 2014/0204854 A1* | 7/2014 | Freda | H04L 1/18 370/329 |
| 2014/0219202 A1* | 8/2014 | Kim | H04L 1/1861 370/329 |
| 2015/0055519 A1* | 2/2015 | Lin | H04L 1/1607 370/280 |
| 2015/0055521 A1* | 2/2015 | Seo | H04L 5/001 370/280 |
| 2015/0063250 A1* | 3/2015 | Lahetkangas | H04L 1/1812 370/329 |
| 2015/0078221 A1* | 3/2015 | Seo | H04L 5/001 370/280 |
| 2015/0207594 A1* | 7/2015 | Si | H04L 1/1861 370/280 |
| 2016/0021655 A1* | 1/2016 | Seo | H04L 1/1829 370/280 |

FOREIGN PATENT DOCUMENTS

| | | |
|---|---|---|
| EP | 1646256 A1 | 4/2006 |
| EP | 2600549 A2 | 5/2013 |
| JP | 2012-054711 A | 3/2012 |
| WO | 2009120701 A2 | 10/2009 |
| WO | 2011/011758 A1 | 1/2011 |
| WO | 2011/038252 A2 | 3/2011 |
| WO | 11078581 A2 | 6/2011 |
| WO | 2011109190 A2 | 9/2011 |
| WO | 2012/015216 A2 | 2/2012 |

OTHER PUBLICATIONS

Huawei: "Ordering and segmentation of HARQ-ACK bits for TDD", R1-110553, 3GPP TSG RAN WG1 Meeting #63bis, Dublin, Ireland, Jan. 17-21, 2011.

Huawei: "Details of TDD-FDD CA", R1-134056, 3GPP TSG RAN WG1 Meeting #74bis, Guangzhou, China, Oct. 7-11, 2013.

CATT: "PDSCH timing with TDD as PCell for FDD-TDD CA", R1-134095, 3GPP TSG RAN WG1 Meeting #74bis, Guangzhou, China, Oct. 7-11, 2013.

"Views on TDD inter-band CA with different UL-DL configurations", 3GPP TSG-RAN WG1 Meeting #67, R1-113803, San Francisco, USA, Nov. 14-18, 2011.

"Views on inter-band CA with different TDD configurations on different bands" 3GPP TSG-RAN WG1 Meeting #67, R1-114309, San Francisco, USA, Nov. 14-18, 2011.

"Support of CA for different TDD UL-DL configurations", 3GPP TSG RAN WG1 #68-BIS, R1-121793, Jeju, Korea, Mar. 26-30, 2012.

* cited by examiner

METHOD AND APPARATUS FOR AGGREGATING CARRIERS IN WIRELESS COMMUNICATION SYSTEMS

This application is a continuation of U.S. patent application Ser. No. 15/658,082, filed on Jul. 24, 2017, which is a continuation of Ser. No. 15/258,659, filed on Sep. 7, 2016, now U.S. Pat. No. 9,743,409, which is a continuation of U.S. patent application Ser. No. 14/390,315, filed on Oct. 2, 2014, now U.S. Pat. No. 9,462,587, which is a 371 National Stage entry of International Application No. PCT/KR2013/002887, filed on Apr. 5, 2013, and claims the benefit of U.S. Provisional Application No. 61/620,449, filed on Apr. 5, 2012, U.S. Provisional Application No. 61/636,740, filed on Apr. 23, 2012, U.S. Provisional Application No. 61/667,947, filed on Jul. 4, 2012, U.S. Provisional Application No. 61/702,214, filed on Sep. 17, 2012, U.S. Provisional Application No. 61/738,401, filed on Dec. 18, 2012 and U.S. Provisional Application No. 61/750,316, filed on Jan. 8, 2013, all of which are incorporated by reference in their entirety herein.

BACKGROUND OF THE INVENTION

Field of the Invention

The present invention relates to wireless communications, and more particularly, to a method and apparatus for aggregating carriers in a wireless communication system.

Related Art

A carrier aggregation system has recently drawn attention. The carrier aggregation system implies a system that configures a broadband by aggregating one or more component carriers (CCs) having a bandwidth smaller than that of a target broadband when the wireless communication system intends to support the broadband. In the carrier aggregation system, a term, serving cell, is also used instead of the CC. Herein, the serving cell consists of a pair of downlink component carrier (DL CC) and uplink component carrier (UL CC), or consists of only the DL CC. That is, the carrier aggregation system is a system in which a plurality of serving cells is assigned to one user equipment.

Conventionally, in the carrier aggregation system, it is considered to aggregate only CC of the same mode. That is, it is considered to aggregate the CCs that operate in the frequency division duplex (FDD) mode or to aggregate the CCs that operate in the time division duplex (TDD) mode. Particularly, in case of the TDD, it is assumed that the CCs which are aggregated use the same uplink-downlink (UL-DL) configuration. The UL-DL configuration is to notify which one is used either uplink (UL) or downlink (DL) for the respective subframes within the frame that is made up of multiple subframes.

However, in the future wireless communication system, it may not be required to confine the above considerations.

SUMMARY OF THE INVENTION

The present invention provides a method and apparatus for aggregating carriers in a wireless communication system.

In an aspect, a method for aggregating carriers in a wireless communication system includes configuring a first carrier; and configuring a second carrier in addition to the first carrier, wherein the first carrier is a time division duplex (TDD) carrier in which uplink subframe and downlink subframe are located on different time in a frame, and wherein the second carrier is a downlink only carrier comprised of downlink subframe only.

In another aspect, an apparatus for aggregating carriers in a wireless communication system includes a radio frequency (RF) unit that transmits and receives a radio signal; and a processor operating functionally connected with the RF unit, wherein the process is configured to perform, configuring a first carrier; and configuring a second carrier in addition to the first carrier, wherein the first carrier is a time division duplex (TDD) carrier in which uplink subframe and downlink subframe are located on different time in a frame, and wherein the second carrier is a downlink only carrier comprised of downlink subframe only.

Even in case of introducing a carrier of new type that does not have backward compatibility with the existing carriers defined in a wireless communication system, it is available to perform carrier aggregation effectively. In addition, the HARQ-timing according to the carrier aggregation can be provided.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
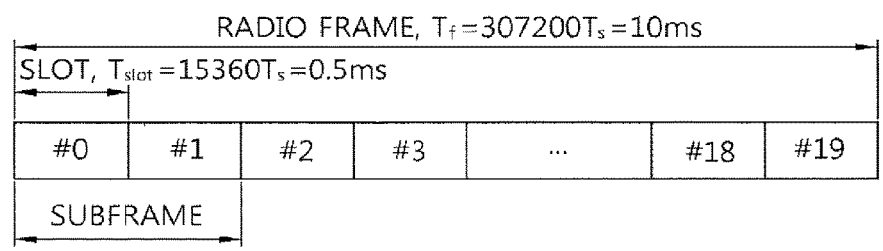
FIG. 1 shows a structure of an FDD radio frame.

FIG. 1 shows a structure of an FDD radio frame.

The FDD radio frame (hereinafter, simply referred to as FDD frame) includes 10 subframes. One subframe includes two consecutive slots. Slots included in the FDD frame are indexed from 0 to 19. The time which is required to transmit one subframe is defined as transmission time interval (TTI) and the TTI may be a minimum scheduling unit. For example, one subframe may have a length of 1 millisecond (ms), and one slot may have a length of 0.5 ms. Assuming that the length of a wireless frame is $T_f$, $T_f$=307200 Ts=10 ms (milli-second).

Figure 2:
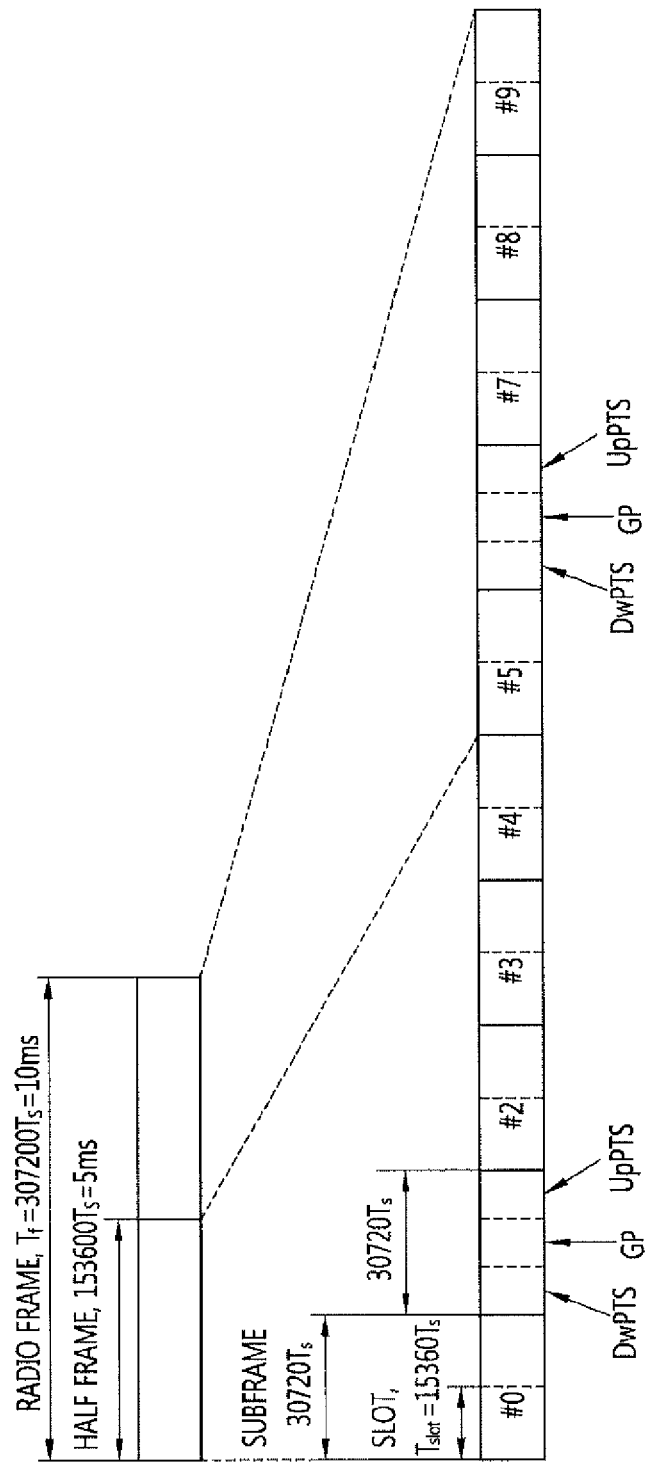
FIG. 2 shows a structure of a TDD radio frame.

FIG. 2 shows a structure of a TDD radio frame.

Referring to FIG. 2, the TDD radio frame (hereinafter, TDD frame) includes 10 subframes. The TDD frame includes an uplink (UL) subframe, a downlink (DL) subframe and a specific subframe (S subframe). When subframes of the TDD frame are indexed starting from 0, a subframe having an index #1 and an index #6 may be a special subframe, and the special subframe includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between uplink and downlink. The GP and the UpPTS take a role of a time gap.

In the TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' represents a UL subframe, 'S' represents a special subframe. If receiving the UL-DL configuration, the UE may be aware whether each of the subframes in the TDD subframe is a DL subframe (or S subframe) or a UL subframe.

Figure 3:
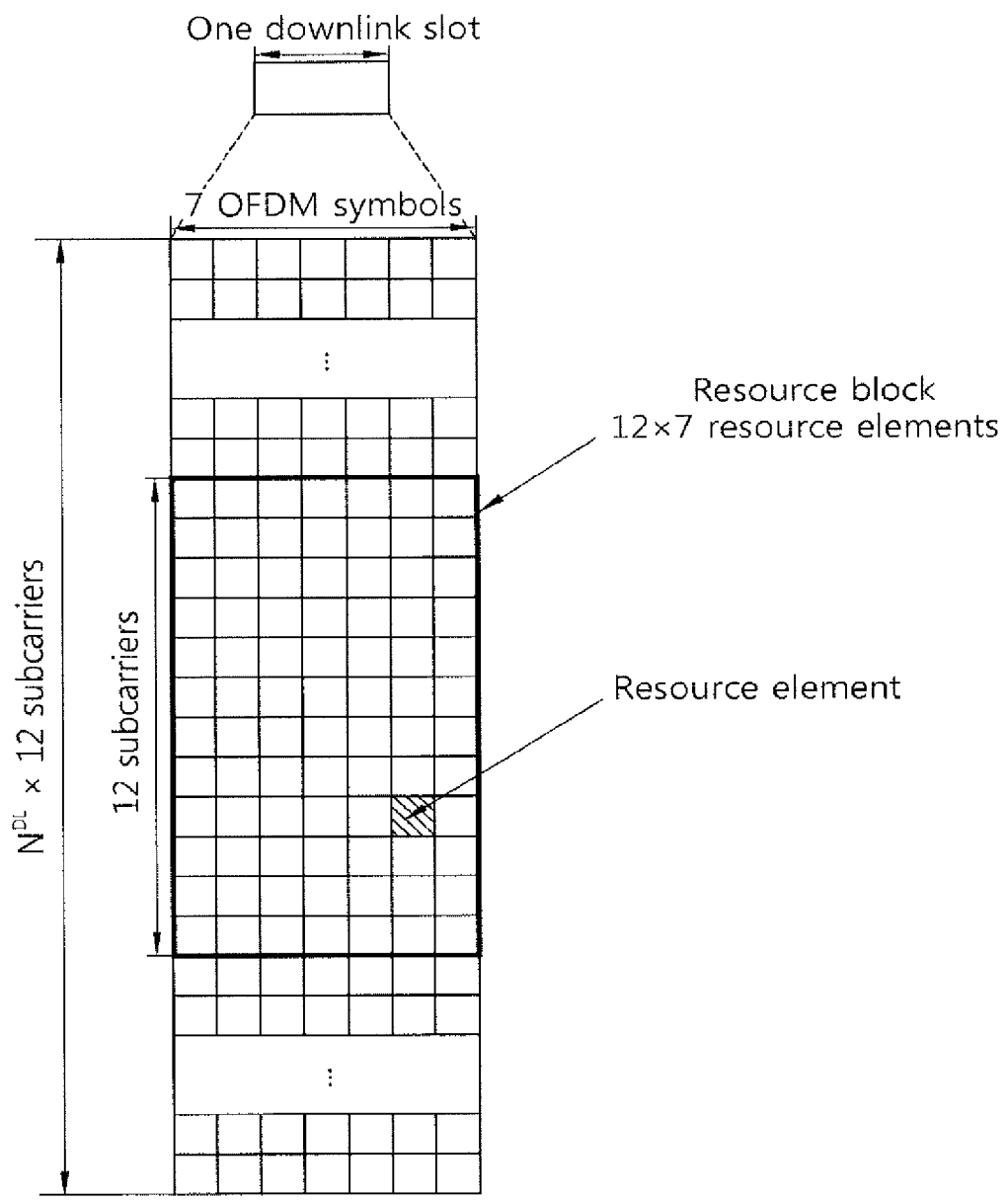
FIG. 3 shows an example of a resource grid for one DL slot.

FIG. 3 shows an example of a resource grid for one DL slot.

Referring to FIG. 3, the DL slot includes a plurality of orthogonal frequency division multiplexing (OFDM) symbols in a time domain, and includes $N_{RB}$ resource blocks (RBs) in a frequency domain. The RB is a resource allocation unit, and includes one slot in the time domain and includes a plurality of sequential subcarriers in the frequency domain. The number $N_{RB}$ of RBs included in the DL slot depends on a DL transmission bandwidth configured in a cell. For example, in the LTE system, $N_{RB}$ may be one in the range of 6 to 110. A structure of a UL slot may be the same as the aforementioned structure of the DL slot.

Each element on the resource grid is referred to as a resource element (RE). The RE on the resource grid can be identified by an index pair (k, l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described in FIG. 3 that one resource block includes 7×12 REs consisting of 7 OFDM symbols in the time domain and 12 subcarriers in the frequency domain for example, the number of OFDM symbols and the number of subcarriers in the resource block are not limited thereto. The number of OFDM symbols and the number of subcarriers may change variously depending on a cyclic prefix (CP) length, a frequency spacing, etc. For example, if the CP length corresponds to an extended CP, the resource block includes 6 OFDM symbols. The number of subcarriers in one OFDM symbol may be selected from 128, 256, 512, 1024, 1536, and 2048.

Figure 4:
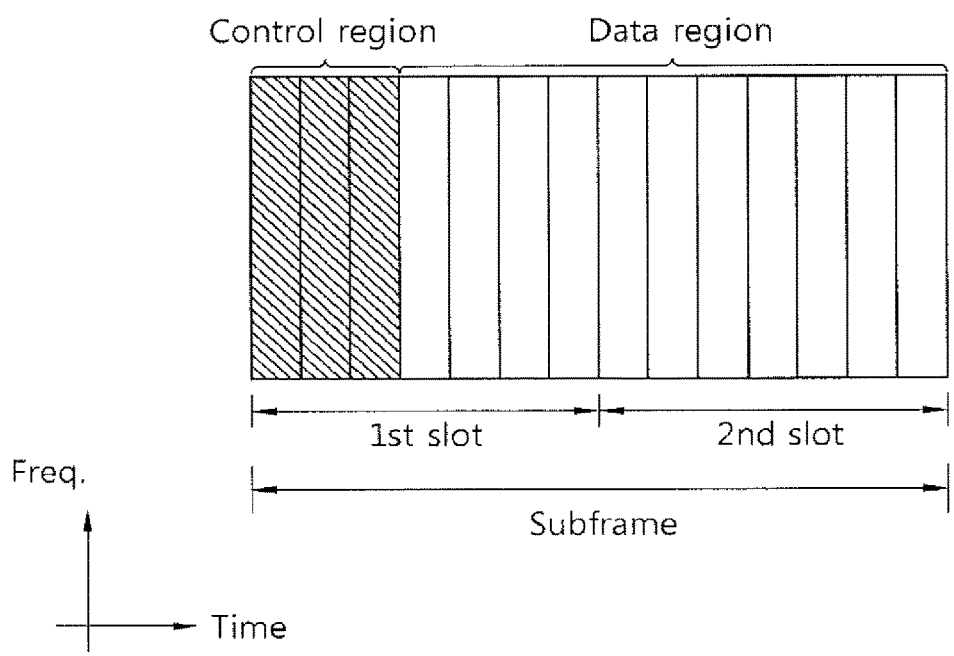
FIG. 4 shows a structure of a DL subframe.

FIG. 4 shows a structure of a DL subframe.

Referring to FIG. 4, the DL subframe is divided into a control region and a data region in the time domain. The control region includes up to three (optionally, up to four) preceding OFDM symbols of a first slot in the subframe. However, the number of OFDM symbols included in the control region may vary. A physical downlink control channel (PDCCH) and another control channel are allocated to the control region, and a physical downlink shared channel (PDSCH), and a physical broadcast channel (PBCH) are allocated to the data region.

A physical control format indicator channel (PCFICH) transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

A physical hybrid-ARQ indicator channel (PHICH) which is transmitted from the control region, and carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The BS determines a PDCCH format according to DCI to be transmitted to the UE, attaches a cyclic redundancy check (CRC) to the DCI, and masks a unique identifier (referred to as a radio network temporary identifier (RNTI)) to the CRC according to an owner or usage of the PDCCH.

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a specific UE (such information is called UE-specific control information), and when another RNTI is used, the PDCCH carries common control information received by all or a plurality of UEs in a cell.

The BS encodes the CRC-attached DCI to generate coded data. The encoding includes channel encoding and rate matching. Thereafter, the BS modulates the coded data to generate modulation symbols, and transmits the modulation symbols by mapping the symbols to a physical resource element (RE).

A PDSCH transmitted in the data region is a downlink data channel. System information, data, etc., can be transmitted through the PDSCH. In addition, the PBCH carries system information necessary for communication between the UE and the BS. The system information transmitted through the PBCH is referred to as a master information block (MIB). In comparison thereto, system information transmitted on the PDCCH is referred to as a system information block (SIB).

Figure 5:
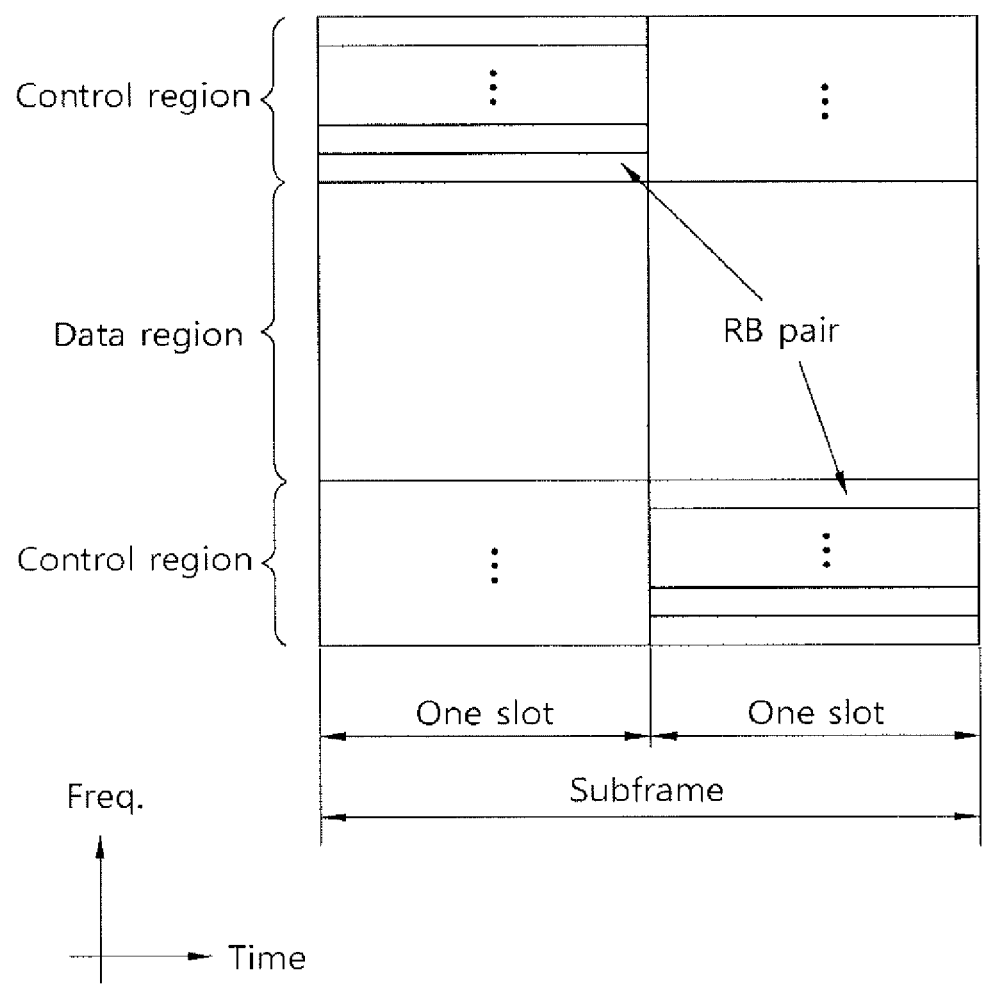
FIG. 5 shows a structure of a UL subframe.

FIG. 5 shows a structure of a UL subframe.

Referring to FIG. 5, the UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a first slot and a second slot.

Figure 6:
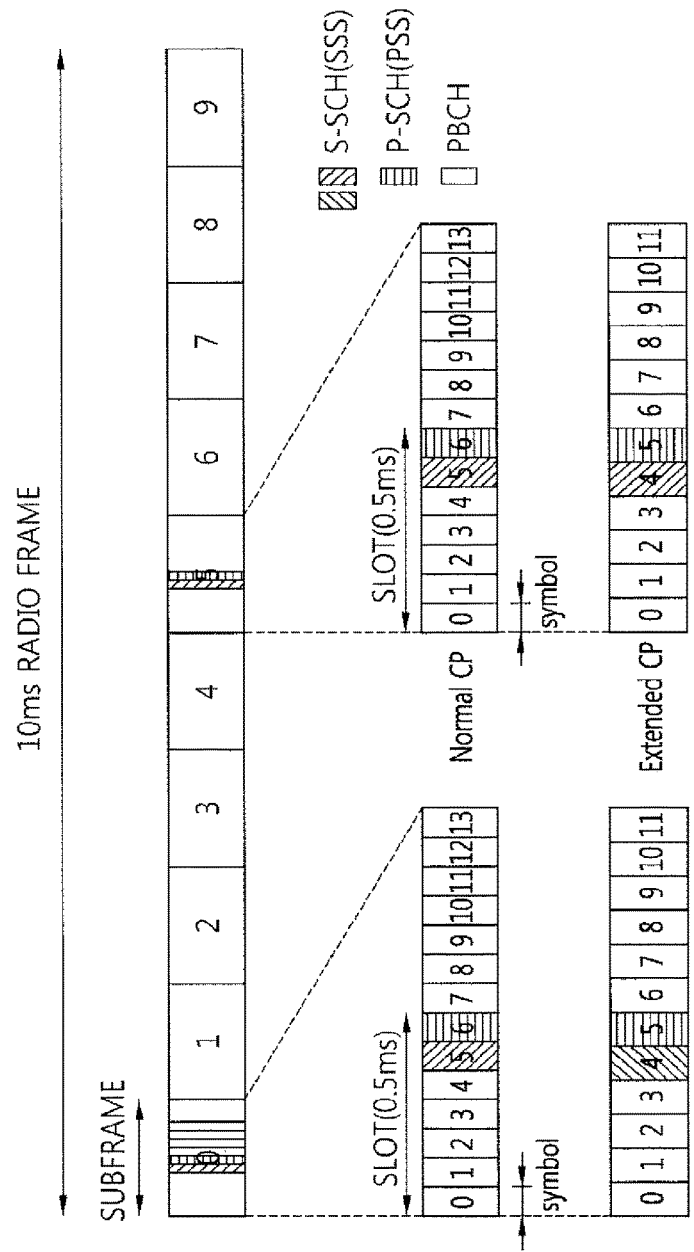
FIG. 6 shows a frame structure for synchronization signal transmission in the conventional FDD frame.

FIG. 6 shows a frame structure for synchronization signal transmission in the conventional FDD frame. A slot number and a subframe number start from 0.

Herein, a synchronization signal is a signal used when a cell search is performed, and includes a primary synchronization signal (PSS) and a secondary synchronization signal (SSS).

The synchronization signal can be transmitted in each of subframes #0 and #5 by considering a global system for mobile communication (GSM) frame length of 4.6 ms to facilitate inter-RAT measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol of the PSS. The synchronization signal can transmit 504 physical cell IDs by combining 3 PSSs and 168 SSSs. A physical broadcast channel (PBCH) is transmitted in first 4 OFDM symbols of a first slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

A transmit diversity scheme of the synchronization signal uses only a single antenna port, and is not separately defined in the standard. That is, single antenna transmission or UE-transparent transmission (e.g., precoding vector switching (PVS), time switched transmit diversity (TSTD), cyclic delay diversity (CDD)) can be used.

For the PSS, a length-63 Zadoff-Chu (ZC) sequence is defined in a frequency domain and is used as a sequence of the PSS. The ZC sequence is defined by Equation 1. A sequence element corresponding to a DC subcarrier, i.e., n=31, is punctured. In Equation 1. $N_{ZC}$=63.

$$d_u(n) = e^{-j\frac{\pi u n(n+1)}{N_{ZC}}} \quad \text{[Equation 1]}$$

Among 6 RBs (i.e., 72 subcarriers), 9 (=72-63) remaining subcarriers are always transmitted with a value of '0', which facilitates a filter design for performing synchronization. To define 3 PSSs, u=25, 29, and 34 are used in Equation 1. In this case, since 29 and 34 have a conjugate symmetry relation, two correlations can be simultaneously performed. Herein, the conjugate symmetry implies the relation of Equation 2 below, and by using this characteristic, a one-shot correlator can be implemented for u=29, 34, and an overall computation amount can be decreased by about 33.3%.

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.} \quad \text{[Equation 2]}$$

A sequence used for the SSS is used by interleaving two m-sequences having a length of 31. The SSS can transmit 168 cell group IDs by combining two sequences. An m-sequence used as a sequence of the SSS is robust to a frequency selective environment, and can decrease a computation amount according to a fast m-sequence transform using a fast Hadamard transform. In addition, it is proposed to configure the SSS by using two short codes in order to decrease a computation amount of the UE.

Figure 7:
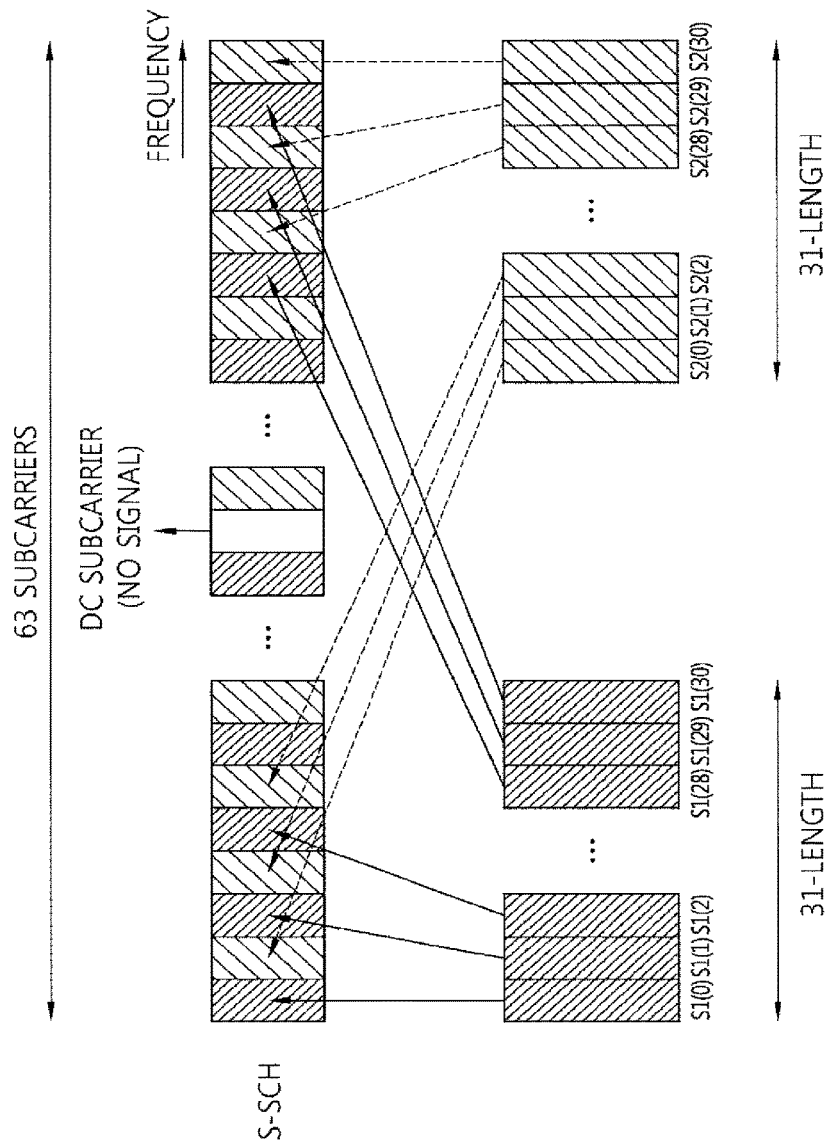
FIG. 7 shows a case where two sequences in a logical domain are interleaved and mapped in a physical domain.

FIG. 7 shows a case where two sequences in a logical domain are interleaved and mapped in a physical domain.

Referring to FIG. 7, when two m-sequences used to generate an SSS code are respectively defined by S1 and S2, if an SSS of a subframe 0 transmits a cell group ID by combining the two sequences (S1, S2), an SSS of a subframe 5 is transmitted by swapping to (S2, S1), thereby being able to identify a boundary of 10 m frame. The SSS code used herein uses a generator polynomial of $x^5+x^2+1$, and 31 codes can be generated by using different circular shifts.

To improve reception performance, two different PSS-based sequences are defined and then are scrambled to an SSS such that different sequences are scheduled to S1 and S2. Thereafter, an S1-based scheduling code is defined, and scheduling is performed on S2. In this case, a code of the SSS is swapped in a unit of 5 ms, whereas the PSS-based scrambling code is not swapped. The PSS-based scrambling code can be defined as a version of 6 circular shifts according to an index of PSS at an m-sequence generated from a generator polynomial of $x^5+x^3+1$. The S1-based scrambling code can be defined as a version of 8 circular shifts according to an index of S1 at an m-sequence generated from a generator polynomial of $x^5+x^4+x^3+x^2+x^1+1$.

Figure 8:
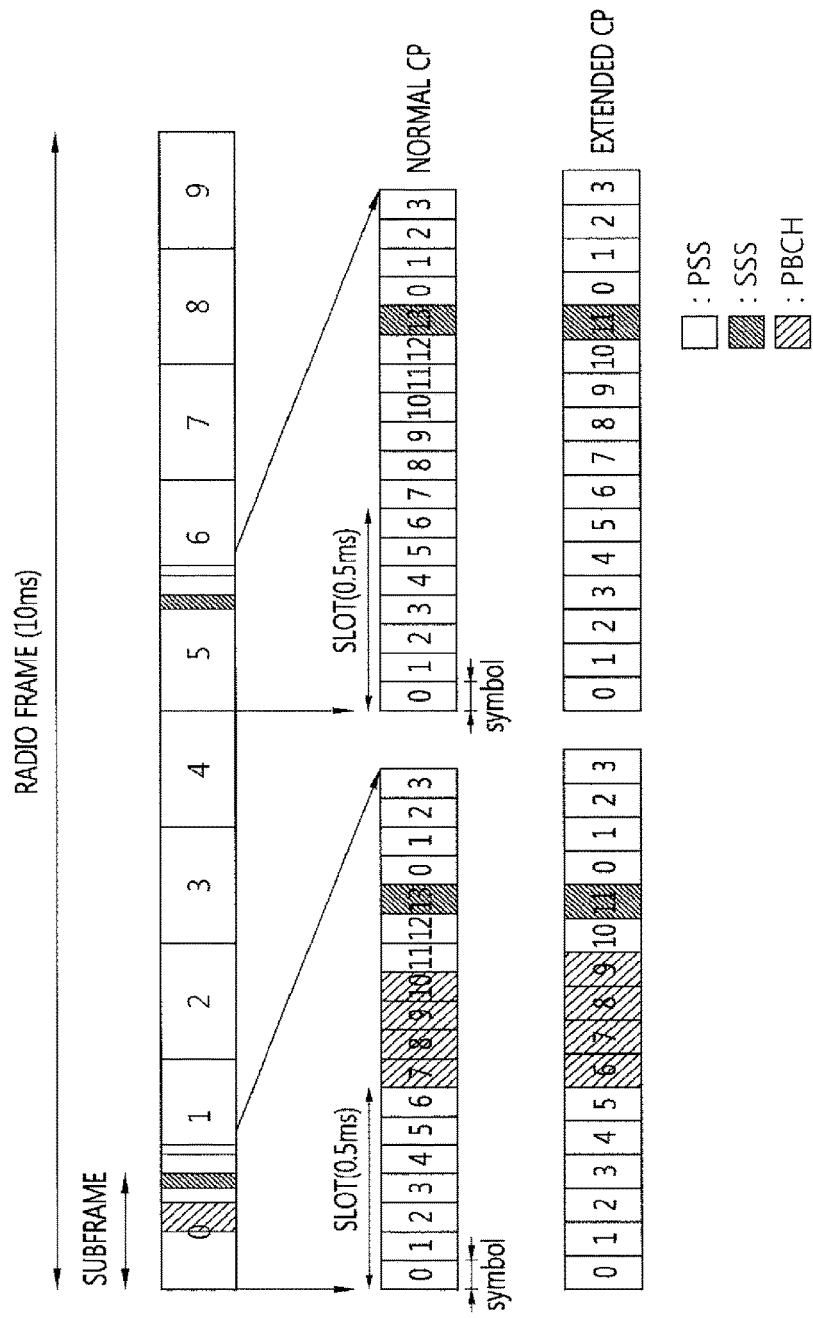
FIG. 8 shows a frame structure for transmitting a synchronization signal in the conventional TDD frame.

FIG. 8 shows a frame structure for transmitting a synchronization signal in the conventional TDD frame.

In a TDD frame, a PSS is transmitted in a third OFDM symbol of third and $13^{th}$ slots. An SSS is transmitted three OFDM symbols earlier than the OFDM symbol in which the PSS is transmitted. A PBCH is transmitted in first 4 OFDM symbols of a second slot of a first subframe.

Now, a carrier aggregation system will be described.

Figure 9:
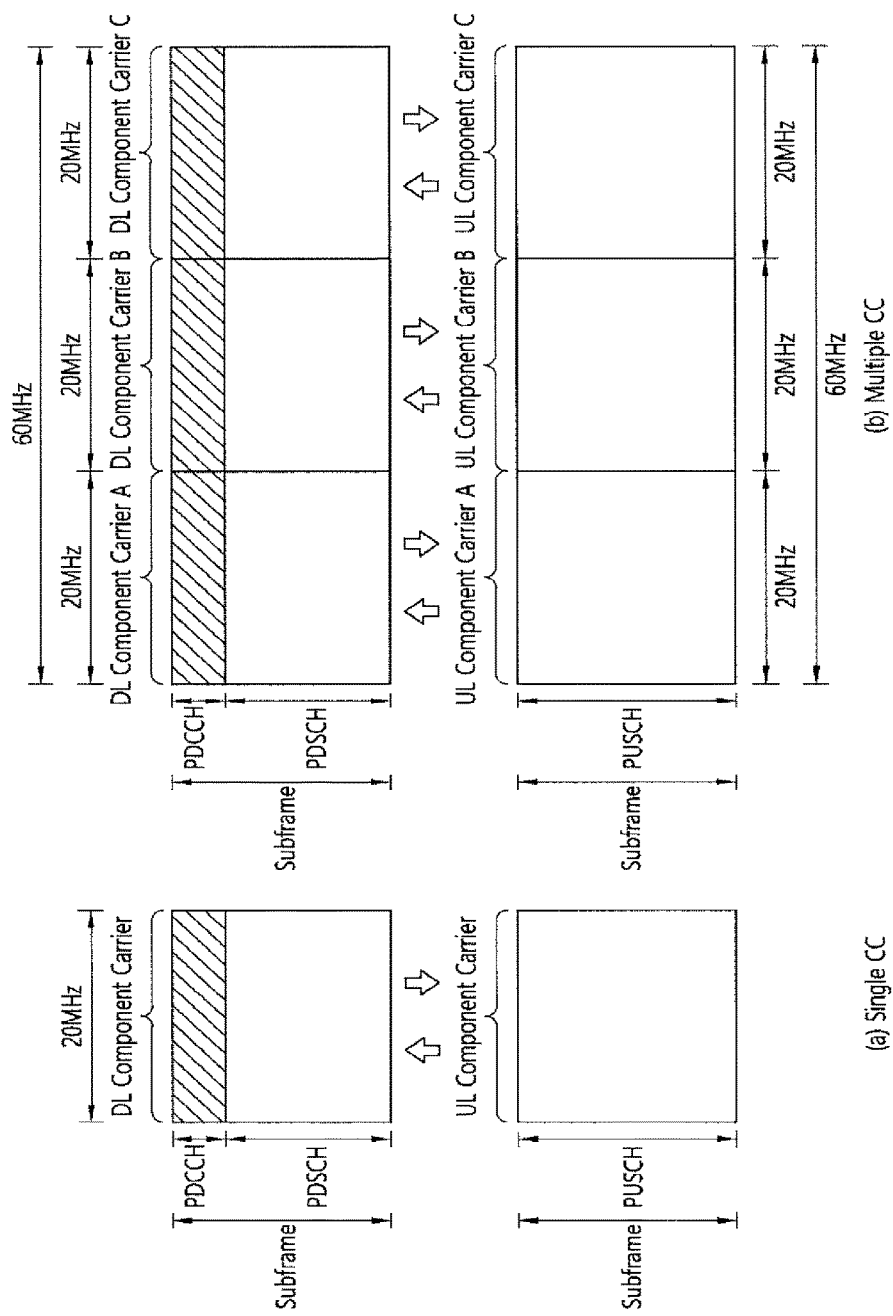
FIG. 9 shows an example of comparing a single-carrier system and a carrier aggregation system.

FIG. 9 shows an example of comparing a single-carrier system and a carrier aggregation system.

Referring to FIG. 9, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA)

system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

When carrier aggregation is configured, the UE has only one RRC connection with the network. In an RRC connection establishment/re-establishment, handover process, one cell provides non-access stratum (NAS) mobility information and a security input. Such a cell is called a primary cell. In other words, the primary cell implies one serving cell which provides a security input in an RRC connection establishment procedure/connection re-establishment procedure/handover procedure performed by the UE with respect to the BS.

The secondary cell implies a cell configured to provide an additional radio resource after establishing an RRC connection through the primary cell.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features from a perspective of each UE.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection process. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support multiple component carriers (CCs) unlike a single-carrier system.

The present invention will now be described.

In the carrier aggregation system, one UE may transmit and receive data/control information using multiple cells. The UE uses a cell that is initially connected as a primary cell, and uses the cell that is additionally configured through the primary cell as a secondary cell.

As described above, the primary cell is used for the operation for maintaining the connection between a BS and a UE. For example, in the primary cell may be performed the operations such as radio link management (RLM), radio resource management (RRM), reception of system information, physical random access channel (PRACH) transmission, uplink control channel (PUCCH) transmission, and the like. Meanwhile, the secondary cell is mainly used for the transmission of the scheduling information for data channels or the data channels.

The primary cell and the secondary cell are UE-specific. When multiple cells exist in a system, each of the cells may be used for the primary cell or the secondary cell, and each of the UEs uses one of the multiple cells as the primary cell. That is, an arbitrary cell may be used as the primary cell or the secondary cell. Accordingly, all of the cells are configured to perform the operation of the primary cell.

In other words, all of the cells are expected to implement all of these operations such as the transmission of synchronization signal, the transmission of broadcast channel, the transmission of CRS, the configuration of PDCCH region, and the like are implemented. Those cells may be referred to as backward compatible cells or legacy carrier type (LCT) in the aspect of carrier.

Meanwhile, if a cell is used as the secondary cell in the future wireless communication system, it is considered to introduce the cell of which a part or all of the unnecessary information is removed. Such a cell may be represented not to have backward compatibility, and referred to as a new carrier type (NCT) or extension carrier in comparison with the LCT.

For example, in the NCT, it may be configured to transmit the CRS only at a part of time interval or only at frequency interval without transmitting in every subframe, or the DL control channel region may be newly configured, which is specified for each UE by removing the DL control channel region such as existing PDCCH or reducing to a time region or frequency region.

Such an NCT may be a carrier in which only DL transmission is allowed. Hereinafter, the carrier in which only DL transmission is allowed is short for a DL only carrier, for the convenience.

Figure 10:
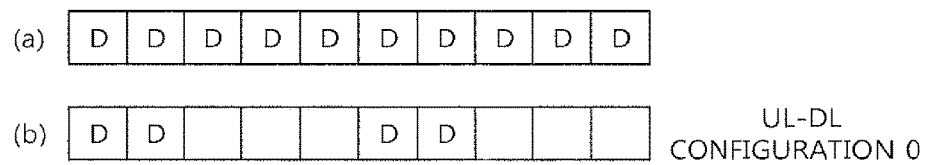
FIG. 10 exemplifies the DL only carrier.

FIG. 10 exemplifies the DL only carrier.

The DL only carrier may be configured by various methods. For example, in FDD, the DL only carrier may be a cell in which only DL CC exists. That is, as shown in FIG. 10(a), in FDD, the DL only carrier may be the DL CC in which corresponding UL CC does not exist. Or, even for the DL CC in which exists the UL CC that is linked by system information block (SIB), the DL only carrier may be configured by setting to use only DL CC without using the UL CC.

In TDD, the DL only carrier uses the UL-DL configuration of Table 1 and it is available to be generated to use the DL subframe only according to the corresponding UL-DL configuration. In the LCT, UL subframe/DL subframe are included by time division in a frame according to the UL-DL configuration defined in Table 1, but in the DL only carrier, only DL subframe is included as shown in FIG. 10(b). However, such a method causes resource waste since the subframe which is supposed to be configured as UL subframe is not going to be used according to the UL-DL configuration.

Accordingly, in case that the DL only carrier is used in TDD, it is preferable that all of the subframes in a frame are comprised of DL subframes only.

For this, additional UL-DL configuration may be added in the conventional UL-DL configuration as shown in Table 1. The following table represents an example of UL-DL configuration according to the present invention.

TABLE 2

| Uplink-downlink configuration | Downlink-to-Uplink Switch-point periodicity | \multicolumn{10}{c}{subframe number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | D | D | D | D | D | D | D | D | D | D |

In Table 2, UL-DL configurations 0 to 6 are the same as those of the existing UL-DL configuration, and the UL-DL configuration 7 is added onto it. The UL-DL configuration 7 represents that all of the subframes in a frame are configured as DL subframe. It may be limited that UL-DL configuration 7 is used only for the secondary cell without being used for the primary cell. In other words, in order to avoid interference between frequency bands, it may be limited that the DL only carrier use only frequency band (the secondary cell) which is different from that of the existing TDD primary cell.

The method above may define the UL-DL configuration 7 in order to configure the DL only carrier and directly notify it to a UE.

Figure 11:
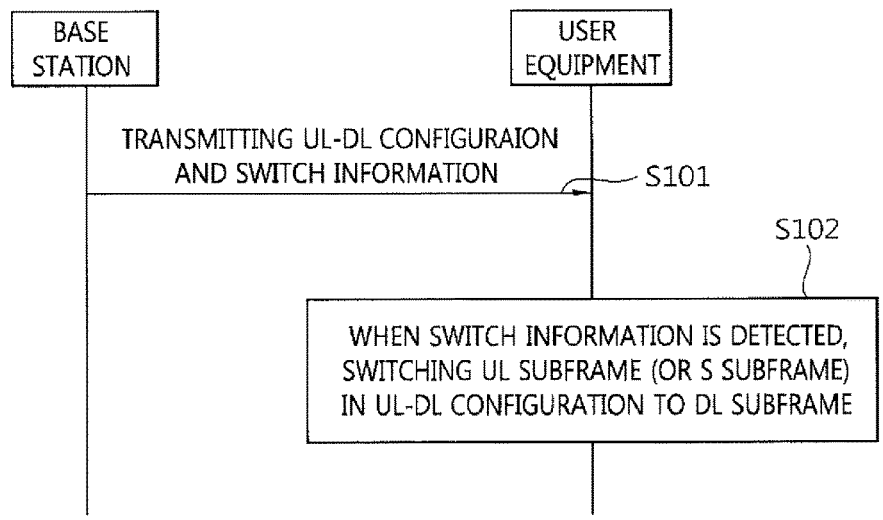
FIG. 11 shows another example of configuring the DL only carrier.

FIG. 11 shows another example of configuring the DL only carrier.

Referring to FIG. 11, the BS transmits the UL-DL configuration and switch information (S101).

The UL-DL configuration may be one of the existing UL-DL configurations 0 to 6 of Table 1.

The switch information may be the information that represents UL whether it is changed to the UL subframe in the corresponding UL-DL configuration, and whether it is changed to the DL subframe of a special subframe. According to the switch information, all of the UL subframes (or S subframe) in a frame may be switched to the DL subframe, or only a part of UL subframes (or S subframe) may be switched to DL subframe. The switch information may be implemented in various ways. For example, the switch information represents whether the UL subframe (or S subframe) has been used or not, but what the UL subframe (or S subframe) has been not used may mean that the UL subframe (or S subframe) is used as a DL subframe.

For the configuration of the DL only carrier, it may be applied for the method of stopping the use of the UL subframe (for example, only suspending the channel which is transmitted from the first SC-FDMA symbol are transmitted in the UL subframe such as PUSCH, PUCCH, and so on but available to use the channel which is transmitted from the last SC-FDMA symbol of the UL subframe such as SRS) or the method that the configuration of the UL subframe is changed to the DL subframe to use.

Herein, it is available to change the S subframe to the DL subframe owing to not using the UL subframe. In case of changing the S subframe only to GP and the DL subframe that doesn't contain the UpPTS to use without switching the UL subframe to the DL subframe, there is advantages that the unnecessary GP and UpPTS may be used in downlink and the time relations of the control channel transmission of the DL/UL HARQ process, data channel transmission. HARQ-ACK transmission and so on in the existing UL-DL, configuration may be applied same as the existing definition without any changes. Or, in case of utilizing the existing TDD UL-DL configuration not using the UL subframe while the DL subframe is left, it is available to designate to use the UL-DL configuration 5 only which has the least UL subframes.

The UE, if the switch information is detected, switches the UL subframe (or the S subframe) of the UL-DL configuration to the DL subframe (step, S102). The switch information may transmit in the corresponding cell-specific signaling or UE-specific signaling.

If the DL only carrier use is used for the carrier aggregation, there is an advantage that the DL only carrier use above is shared as the secondary cell between the FDD terminal and the TDD terminal in common.

The carrier that is configured only for DL use and available for aggregation is not limited to NCT but applied for LCT.

Meanwhile, the DL only carrier use may have two formats. That is, the FDD format and the TDD format are those. The DL only carrier use performed by the FDD format (hereinafter the carrier only for FDD DL use is short for it) is the DL only carrier in which synchronization signal, PBCH, user-specific reference signal (URS) and so on are transmitted by the FDD method (referring to FIG. 6). The DL only carrier use performed by the TDD format (hereinafter the carrier only for TDD DL use is short for it) is the DL only carrier in which synchronization signal, PBCH, URS and so on are transmitted by the TDD method (referring to FIG. 8). The URS may be a reference that is used for demodulation of the data/control signal as a UE-specific reference signal. All of the carriers only for DL use of two formats are common in that all of the subframes within a frame are DL subframes, but different in the structures of the synchronization signal, PBCH and so on.

In case that the secondary cell is added in the primary cell, the primary cell may be the cell that is operated by TDD or FDD, and in case that the secondary cell is the DL only carrier use, the DL only carrier use above may be the carrier only for TDD DL use or the carrier only for FDD DL use. Therefore, four combinations are available in all.

When the base station configures the DL only carrier use as the secondary cell in addition to the UE, it may notify whether the additional DL only carrier use is the carrier only for TDD DL use or the carrier only for FDD DL use. Or when the base station command the measurement of a specific carrier to the UE, it may notify which one is it either the carrier only for TDD DL use and the carrier only for FDD DL use. Such information that is about the format of the carrier wave is referred to as the frame structure indicating information. The frame structure indicating information makes it easy to detect the PSS/SSS of the secondary cell and the cell ID.

Or, without any overt signaling of the base station that is same as the frame structure indicating information, the UE may recognize the format of the secondary cell through the process that the additional secondary cell detects the PSS/SSS.

In case of confirming the frame boundaries of the primary cell and secondary cell, it is available to recognize the frame structure with only the location of the PSS to be detected (that is, the subframe number that the PSS is detected and the OFDM symbol). Accordingly, the base station may transmit the frame structure indicating information only in case that the frame boundaries of the primary cell and the secondary cell is not agreed, or transmit it to the UE only in case of commanding the measurement of the secondary cell. It may be applied to the aggregation of the TDD primary cell and the FDD secondary cell and the aggregation of the FDD primary cell and the TDD secondary cell identically as well as the DL only carrier use.

Meanwhile, in case that the primary cell that is operated by the FDD (FDD primary cell) is aggregating the secondary cell that is operated by the TDD (TDD secondary cell), the DL only carrier use may be applied for the TDD secondary cell. In this case, there is a case that the DL subframe which is a CSI detection object in the TDD secondary cell is to be restricted as the DL subframe of the UL-DL configuration. This is because, even though corresponding UE does not use the UL subframe of the UL-DL configuration, the other UE may be configured to use the corresponding UL subframe for the UL transmission.

In case that the primary cell that operates as the TDD (the TDD primary cell) aggregates the secondary cell that operates as the FDD (the FDD secondary cell), the DL only carrier may be applied to the FDD secondary cell. In this case, the DL subframe which is an object for CSI detection may be restricted as the DL subframe of the UL-DL configuration. This is useful, by applying the existing UL-DL configuration to the secondary cell and using only the corresponding DL subframe, that is, the case that the secondary cell is used only for DL in the way that the UL subframe of the corresponding UL-DL configuration is not used.

Or, the NCT may be the carrier in which UL transmission is only allowed. Hereinafter, the carrier in which only UL transmission is allowed is short for a UL only carrier, for the convenience.

Figure 12:
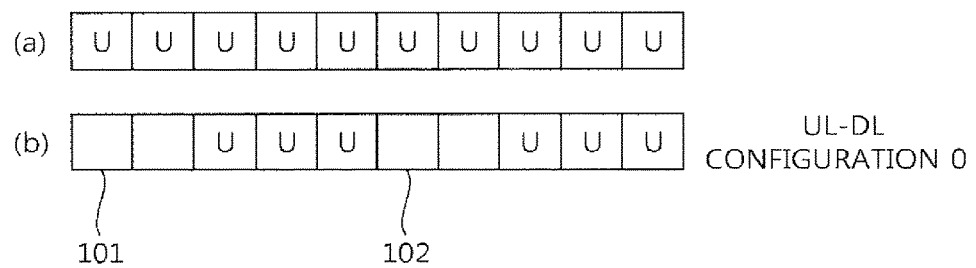
FIG. 12 exemplifies the UL only carrier.

FIG. 12 exemplifies the UL only carrier.

The UL only carrier may be configured by various methods. For example, in FDD, the UL only carrier may be a cell in which only UL CC exists. That is, as shown in FIG. 12(*a*), in FDD, the UL only carrier may be the DL CC in which corresponding UL CC does not exist. Or, even for the UL CC in which exists the UL CC that is linked by system information block (SIB), the UL only carrier may be configured by setting to use only UL CC without using the DL CC.

In TDD, the UL only carrier uses the UL-DL configuration of Table 1 and it is available to be generated to use only UL subframe without using the DL subframe according to the corresponding UL-DL configuration. In the LCT, UL subframe/DL subframe are included by time division in a frame according to the UL-DL configuration defined in Table 1, but in the UL only carrier, only UL subframe is included as shown in FIG. 10(b). However, such a method causes resource waste since the subframe (for example, 101 and 102) which is supposed to be configured as DL subframe is not going to be used according to the UL-DL configuration.

Accordingly, in case that the UL only carrier is used in TDD, it is preferable that all of the subframes in a frame are comprised of UL subframes only.

For this, additional UL-DL configuration may be added in the conventional UL-DL configuration as shown in Table 1. The following table represents an example of UL-DL configuration according to the present invention.

TABLE 3

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | U | U | U | U | U | U | U | U | U | U |

In Table 3, UL-DL configurations 0 to 6 are the same as those of the existing UL-DL configuration, and the UL-DL configuration 7 is added onto it. The UL-DL configuration 7 represents that all of the subframes in a frame are configured as UL subframe. It may be limited that UL-DL configuration 7 is used only for the secondary cell without being used for the primary cell. In other words, in order to avoid interference between frequency bands, the UL only carrier may be used for the secondary cell in a different frequency band which is different from that of the existing TDD primary cell. The method above may define the UL-DL configuration 7 in order to configure the DL only carrier and directly notify it to a UE.

Meanwhile, a BS selects one of the DL only carrier and the UL only carrier and aggregates it as a secondary cell, UL-DL configuration 7 of Table 2 may be added to Table 3. That is, total nine UL-DL configurations may be included in Table 3, and UL-DL configuration 7 of Table 2 may be added to Table 3 as UL-DL configuration 8.

Or, a BS uses the existing UL-DL configurations 0 to 6 but may additionally use the method of transmitting information indicating the DL only carrier or the UL only carrier.

Hereinafter, in the DL only carrier, it is assumed that all subframes in a frame are comprised of DL subframes as shown in FIG. 10(a), and the DL HARQ-ACK (hereinafter, shortened by HARQ-ACK) timing will be described in case that the DL only carrier is aggregated to a secondary cell.

The existing FDD has the HARQ-ACK timing when transmitting the ACK/NACK for a data unit (for example, a transmission block, codeword, and etc.) that a UE receives in subframe n−4 by subframe n. In TDD has the HARQ-ACK timing as represented by following table. In Table 4, each value may be represented by aggregation K, and has the element of $K=\{k_0, k_1, \ldots, k_{M-1}\}$. For example, in UL-DL configuration 1, $K=\{7, 6\}$ and M=2 for subframe 2. The terms $k_0, k_1, \ldots, k_{M-1}$ may be represented by $k_m$ (m=0, 1, ..., or M−1).

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | 7 | 7 | — | |

Table 4 shown above represents the corresponding relation of the DL subframe $n-k_m$ that corresponds to UL subframe n in each UL-DL configuration as the value of $k_m$. That is, it signifies that the ACK/NACK for the PDSCH which is transmitted from subframe $n-k_m$ is transmitted from UL subframe n.

However, in case of using the TDD DL only carrier for a secondary cell, the configuration of DL HARQ timing of the secondary cell may be problematic. That is, the configuration of ACK/NACK response timing through the primary cell for the PDSCH which is received in the secondary cell is required.

Method 1.

Method 1 is the method that the HARQ-ACK timing for a secondary cell is to follow the DL HARQ-ACK timing which is configured according to the UL-DL configuration which is configured in a primary cell. For example, in case that the primary cell is a TDD cell and uses UL-DL configuration 1 and the secondary cell is the DL only carrier, the ACK/NACK for the data unit which is received in subframe 0 of the secondary cell is transmitted from subframe 7 of the primary cell, in this time, subframe 7 is a subframe configured to transmit ACK/NACK for the data unit which is received in subframe 0 of the primary cell.

Method 2.

There is a configuration that the number of DL subframe is more than that of the UL subframe in a frame among the UL-DL configurations. For example, UL-DL configurations 2, 4, 5, and the like have more DL subframes more than UL subframes. Like this, the DL HARQ-ACK timing according to the UL-DL configuration that has more DL subframes may be used as the HARK-ACK reference timing of a secondary cell. However, the UL subframes according to the UL-DL configuration of the secondary cell should be subset of the UL subframes according to the UL-DL configuration of a primary cell.

For example, in case that the UL-DL configuration of the primary cell is 0, 1 and 2, the HARQ-ACK timing according to UL-DL configuration 2 and 5 may be used as the HARK-ACK reference timing of a secondary cell. In case that the UL-DL configuration of the primary cell is 3, 4, 5 and 6, the HARQ-ACK timing according to UL-DL configuration 5 may be used as the HARK-ACK reference timing of a secondary cell.

According to Method 1 and Method 2 above, a HARQ-ACK timing is determined for the DL subframe of the secondary cell which is overlapped with the DL subframe of the primary cell. However, a HARQ-ACK timing is not determined for the DL subframe of the secondary cell which is overlapped with the UL subframe of the primary cell. The HARQ-ACK timing for the DL subframe of the secondary cell which is overlapped with the UL subframe of the primary cell may use one of the following methods. That is, Methods 1 and 2 and Methods 3 to 7 may be used with being combined.

Method 3.

This is the method for selecting the subframe of the fastest primary cell that satisfies the minimum required time (for example, $k_m=4$) which is available to ACK/NACK after receiving a data unit in the subframe of the secondary cell.

Method 4.

Method 4 is the method that the number of ACK/NACK transmitted from each UL subframe is to be equally arranged in the multiple UL subframes preferably without being biased to a specific UL subframe by equalizing the number of DL subframe of the secondary cell that corresponds to each UL subframe of the primary cell preferably.

First of all, Method 4 selects the subframe of the fastest primary cell that satisfies the minimum required time (for example, $k_m=4$) which is available to ACK/NACK after receiving a data unit in each subframe of the secondary cell. By setting the biggest value $k_m$ which is determined in each subframe as a reference timing, the UL subframe of the primary cell which is to transmit ACK/NACK for the data unit which is received in each subframe of the secondary cell is determined. As an example, the maximum ACK/NACK bit that is available to be transmitted by one UL subframe is determined, and if it exceed the maximum ACK/NACK bit, the UL subframe which is to transmit the ACK/NACK that exceeds the maximum ACK/NACK bit may be changed to the next UL subframe or the previous UL subframe. In this time, the UL subframe is changed such that the ACK/NACK for the forgoing PDSCH is not to be transmitted later than the ACK/NACK for the following PDSCH.

The maximum ACK/NACK bit may be changed according to the UL-DL configuration.

When equally distributing the UL subframe of the primary cell that transmits ACK/NACK, the method of equally distributing with including the timing in the existing UL-DL configuration, or the method of equally distributing with new timing, that is, the timing which is added in case of using the secondary cell as the DL only carrier.

In case of performing equal distribution considering the timing of the existing UL-DL configuration, HARQ-ACK timing is deducted as represented by following table. Table 5 may be added to Table 4.

TABLE 5

| UL-DL Configuration (Primary cell) | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5 | 5, 4 | — | — | — | 5 | 5, 4 | — |
| 1 | — | — | 5 | 5 | — | — | — | 5 | 5 | — |
| 2 | — | — | 5 | — | — | — | — | 5 | — | — |
| 3 | — | — | 10 | 10 | 10 | — | — | — | — | — |
| 4 | — | — | 10 | 10 | — | — | — | — | — | — |
| 5 | — | — | 10 | — | — | — | — | — | — | — |
| 6 | — | — | 8 | 6 | 6 | — | — | 5 | 5 | — |

According to the method of equally distributing for only new timing, the following Table 6 may be Table 4.

TABLE 6

| UL-DL Configuration (Primary cell) | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 5 | 5 | 5 | — | — | 5 | 5 | 5 |

Figure 13:
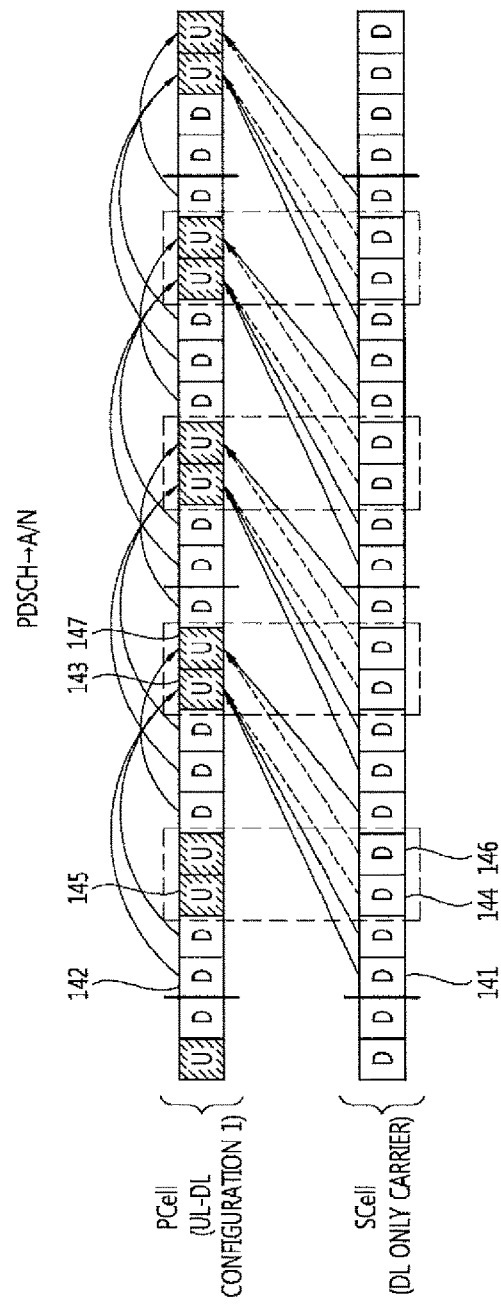
FIG. 13 shows the HARQ-ACK timing in case that Method 1 and Method 4 are combined.

FIG. 13 shows the HARQ-ACK timing in case that Method 1 and Method 4 are combined.

Referring to FIG. 13, the primary cell is a TDD cell according to UL-DL configuration 1, and the secondary cell uses the DL only carrier. In this case, the secondary cell is comprised of only DL subframes. The ACK/NACK for the PDSCH (or transmission block) which is received in the DL subframe of the secondary cell follows the HARQ-ACK timing of the primary cell.

For example, the ACK/NACK for the PDSCH which is received in the DL subframe 141 of the secondary cell is identical to the ACK/NACK transmission timing for the PDSCH which is received in the DL subframe 142 of the primary cell that corresponds to the DL subframe 141, and accordingly, transmitted from the UL subframe 143 of the primary cell. The solid arrow lines represent the ACK/NACK transmission of the secondary cell according to the HARQ-ACK timing of the primary cell.

Meanwhile, the HARQ-ACK timing of the DL subframe of the secondary cell which is overlapped with the UL subframe of the primary cell is set according to Method 4, becomes the HARQ-ACK timing according to the broken arrow lines in FIG. 13. For example, the ACK/NACK for the data unit which is received in the subframe 144 is transmitted from the UL subframe 143 which is located behind 4 subframes and the fastest. The ACK/NACK for the data unit which is received in the subframe 146 is transmitted from the UL subframe 143 which is located behind 4 subframes and the next UL subframe 147, not the fastest UL subframe 143. This is for equal distribution. In this case, the maximum ACK/NACK bit which is available to be transmitted from one UL subframe may be 3 bits.

According to the method, there is an effect of dispersing load since the bit number of ACK/NACK that should be transmitted from one UL subframe can be equalized.

Method 5.

This is the method of limiting the PDSCH scheduling for a specific DL subframe of the secondary cell. For example, the PDSCH scheduling for the DL subframe of the secondary cell which is overlapped with the UL subframe of the primary cell is to be limited.

Exceptionally, the PDSCH transmission that does not require ACK/NACK response from the DL subframe of the secondary cell may be allowed. For example, there may be SIB transmission which is transmitted to the PDSCH.

Method 5 is available to be configured even though the UL-DL configuration which is comprised of only DL subframes like UL-DL configuration 7 of Table 2 is not introduced. For example, the existing UL-DL configurations 0 to 6 are allocated to the DL only carrier, but all of the special subframes may be used as the same structure of the other DL subframe. This is because the configuration of DwPTS, GP and UwPTS are not required in the special subframe since the UL subframe is not used. In this case, when aggregating the DL only carrier in the secondary cell, the signaling notifying that it is the DL only carrier with the UL-DL configuration information (0 to 6). For example, the information notifying whether the UL subframe is used in the corresponding UL-DL configuration or the special subframe is to be used as perfect DL subframe.

Method 6.

Method 6 is the method of signaling the relation between the DL subframe where the PDSCH is transmitted in the secondary cell and the UL subframe of the primary cell where the corresponding ACK/NACK is transmitted by radio resource control (RRC). Method 6 may be applied to overall DL subframes of the secondary cell as well as to the DL subframe of the secondary cell which is overlapped with the UL subframe of the primary cell, also may be commonly or partly applied to the case of aggregating carriers having different UL-DL configurations.

Method 7.

This is the method of transmitting all ACK/NACK in subframe 2 of the primary cell in case that UL-DL configuration 5 is used among UL-DL configurations 0 to 6 as the reference configuration for the HARQ-ACK timing of the secondary cell.

This is to limit the subframe of the primary cell that transmits the ACK/NACK for the data unit which is received in the secondary cell to be the subframe which is the common UL subframe for all UL-DL configurations. For example, referring to UL-DL configuration 0 to 6, subframe 2 is UL subframe for all UL-DL configurations.

Subframe 2 which is fixed to UL subframe for all UL-DL configurations in Method 3 to 6 may be excluded in the timing configuration for PDSCH transmission.

Meanwhile, when the reference UL-DL configuration for HARQ-ACK timing is applied to the secondary cell in TDD, the set $K_{Scell}$ in the reference UL-DL configuration may be different from the set $K_{Pcell}$ in the UL-DL configuration of the primary cell.

In this time, if the cross carrier scheduling in which the scheduling information and the PDSCH following the scheduling are transmitted in different carriers, the primary cell may schedule the secondary cell. The HARQ-ACK timing of the secondary cell is applied according to the set $K_{Scell}$, for the element of $K_{Scell}$ ($k^{Scell}_n$) having the same value as the element of $K_{Pcell}$ ($k^{Pcell}_n$) in the UL subframe which is the same for the primary cell and the secondary cell, m of $k^{Pcell}_n$ is applied when mapping implicit PUCCH resource of the primary cell (for example, in case of default antenna port, $n^{(1,p)}_{PUCCH}=(M\ m-1)\cdot N_c+m\cdot N_{c+1}+n_{CCE,m}+N^{(1)}_{PUCCH}$).

As an example, in case that the primary cell uses UL-DL configuration 2 and the reference UL-DL configuration of the secondary cell is UL-DL configuration 1, $k^{Scell}_0=7$, $k^{Pcell}_1=7$ in the subframe 2 and consequently m=1 is applied.

For the element $k_m$ in the set K of Table 4, $k_m$ denoting a special subframe in which the possibility of DL scheduling is low and DL scheduling may be restricted (for example, $k_m=11$ and 6 in set K that corresponds to subframe 2 or 7 in UL-DL configurations 3, 4 and 5 or $k_m=7$ in set K that corresponds to subframe 3) is exceptionally arranged as the last element of K. This is for the unification with other UL-DL configurations.

This is to upgrade the efficiency of the use of the implied PUCCH resource that is corresponding to subframe n–$k_m$ (that is, PUCCH format 1a/1b resource that is corresponding to CCE occupied by PDCCH), it may avoid the collision of a region with the center part that is used for PUSCH by mapping the PUCCH resources from the both ends of the system bandwidth in consecutive order.

Therefore, the following method may be applied for the selection of the PUCCH resource corresponding to $k_m$' value that is used to be added with the existing $K_{Pcell}$ (for example, the value shown in Table 5).

Method 8.

Method 8 is a method that configures K' separated from the existing $K_{Pcell}$ and in case of the PUCCH format 1a/1b corresponding to the DL subframe n–$k_m$' that is indicated by $k_m$' of the newly added K', it suggests to use the explicit PUCCH resource (the resource that is directly indicated by RRC, it is available to choose one among a plurality of RRC resources as ARI in addition) not to use the implied PUCCH resource. That is, without any changes in the existing $M_{Pcell}$ value, a separated K' is added. This method is enabled to support a new HARQ-ACK timing without any changes in the rules of implied resources that are conventionally used.

Meanwhile, in case that the UL-DL configuration is 0, two HARQ-ACK timings might be occurred in a UL subframe. However such a method might be inefficient in the utility of the PUCCH resource. Accordingly, such a method is considered that only one explicit PUCCH resource is allocated and only one DL subframe among corresponding two DL subframes is scheduled.

Method 9.

Method 9 is a method that configures the implies mapping to be corresponded from the next of the implies PUCCH resource (towards the center of the bandwidth) to which the existing set $K_{Pcell}$ is corresponding in case of the PUCCH format 1a/1b corresponding to the DL subframe n–$k_m$' that is indicated by $k_m$' of the newly added K', by configuring K' separated from the existing $K_{Pcell}$. That is, it may be set up the correspondence of m value after existing value. This method does not cause any changes in the existing $M_{Pcell}$ value either.

Method 10.

This is a method that is to correspond the mapping of the implies PUCCH resource which corresponds to a special subframe in the existing set K in case of the PUCCH format 1a/1b corresponding to the DL subframe n–$k_m$' that is indicated by $k_m$' of the newly added K', by configuring K' separated from the existing $K_{Pcell}$. This is available to share the corresponding resource as the scheduling for the special subframe is not quite often. This method does not cause any changes in the existing $M_{Pcell}$ value either.

Method 9 and 10 may be selectively applied on the circumstances. For example, method 9 may be applied in case that the special subframe is used for the DL subframe scheduling and otherwise, method 10 may be applied.

Meanwhile, channel selection may be used for the ACK/NACK transmission. The channel selection is to select a PUCCH resource after allocating a plurality of PUCCH resources and to transmit a modulation symbol in the selected PUCCH resources. The detailed contents of ACK/NACK are classified by the selected PUCCH resources and modulation symbol. The channel selection is enabled to transmit maximum 4 ACK/NACK bits.

In case that the channel selection is used, and the number (M) of the DL subframe which corresponds to a UL subframe that transmits the ACK/NACK is bigger than 4, a part or the whole of the DL subframes of the secondary cell that is overlapped with the UL subframe of the primary cell may be restricted on scheduling. In case of restricting a part, the relevant information may be signaled, and indirect information may be utilized such as the method for restricting the subframe set up as an almost blank subframe (ABS) considering the inter-cell interference coordination (ICIC). Or the order may be decided according to the predetermined rule (for example, according to the order in which the ACK/NACK response time is long or short).

The present invention illustrate the case that data unit is scheduled by PDCCH, but also may be applied to the case that it is scheduled by enhanced-PDCCH (E-PDCCH). The enhanced-PDCCH (E-PDCCH) is a control channel that is transmitted to the UE within the conventional PDSCH region apart from the PDCCH. The E-PDCCH may be a control channel that is decoded by URS not by CRS.

Meanwhile, in case that DL only carrier or UL only carrier are aggregated to the secondary cell in the primary cell that is operated by TDD or FDD, the DL only carrier or the UL only carrier may be DL carrier or UL carrier that is selected in the cell defined as a pair of UL carrier and DL carrier.

The base station notifies the cell ID of the cell that is defined as the pair of UL carrier and DL carrier to the UE, and may signal the information to the UE whether the both UL carrier and DL carrier are aggregated at the same time or either one is aggregated in the cell that is defined as the pair of the UL carrier and the DL carrier. The above information may be comprised of two-bit bitmap, and each bit of the bitmap may correspond to each UL carrier and DL carrier of the cell that is defined as a pair of the UL carrier and DL carrier. According to each bit value, it is available to inform which one is aggregated to the secondary cell of the UL carrier and the DL carrier.

The information may be performed dynamically with L2/L1 signaling. As an example of the L2 signaling, it is available to directly indicate the MAC message that is including the information that indicates the DL carrier and the UL carrier. Or for example of an indirect method, it is also available to notify activation/non-activation that are applied to DL carrier/UL carrier in common by existing cell unit with separating by DL carrier/UL carrier.

As for L1 signaling, it is available to notify by using an exclusive control channel that sets up carrier or DL/UL scheduling control channel. In case of using the DL/UL scheduling control channel, it may be set up to ignore the DL/UL scheduling.

Additionally, in case that DL only carrier or UL only carrier are aggregated in the primary cell that is operated in TDD or FDD, by notifying the cell ID of the cell defined for TDD (that is, the cell that is configured with the carrier having the mixture of DL/UL subframes) and the cell that corresponds to the cell ID above may be aggregated to the secondary cell.

Figure 14:
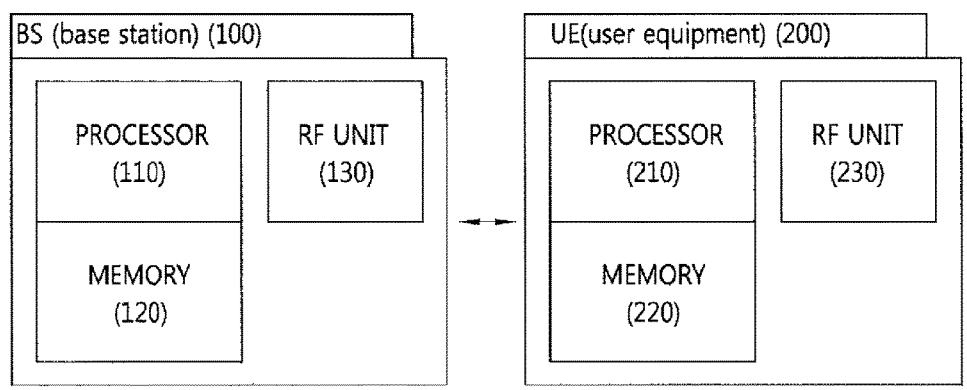
FIG. 14 is a block diagram showing a wireless apparatus for implementing an embodiment of the present invention.

FIG. 14 is a block diagram illustrating a wireless device in which an embodiment of the present invention is implemented.

A BS 100 includes a processor 110, a memory 120, and a radio frequency (RF) unit 130. The processor 110 implements the proposed functions, procedures, and/or methods. For example, the processor 110 transmits synchronization signal configuration information for a secondary cell through a primary cell, and transmits a synchronization signal through the secondary cell. A PBCH can be transmitted in the secondary cell. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 may configure the DL only carrier as the secondary cell using the UL-DL configuration and/or switch information. The ACK/NACK for the data unit which is received through the secondary cell is transmitted through the primary cell, and its HARQ-ACK timing and resource may be referred to the above described methods 1 to 9. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for performing hybrid automatic repeat and request (HARQ) process in a carrier aggregation system, the method performed by a user equipment and comprising:
   receiving data through a physical downlink shared channel (PDSCH) in a subframe n-k of a secondary cell; and
   transmitting ACK/NACK information for the data through a physical uplink control channel (PUCCH) in a subframe n of a primary cell,
   wherein n, k are integers,
   wherein the primary cell uses a time division duplex (TDD) frame and the secondary cell uses a frequency division duplex (FDD) frame,
   wherein a combination of a downlink subframe and an uplink subframe included in the TDD frame is determined by a UL-DL configuration for the primary cell, and
   wherein the FDD frame includes consecutive downlink subframes and consecutive uplink subframes.

2. The method of claim 1, wherein when the UL-DL configuration for the primary cell is one of UL-DL configurations included in a below table 1, wherein D denotes a downlink subframe, S denotes a special subframe and U denotes an uplink subframe:

TABLE 1

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 2 | D | S | U | D | D | D | S | U | D | D |
| 5 | D | S | U | D | D | D | D | D | D | D, | the subframe n and the k are configured according to a below table 2,

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 2 | — | — | 8, 7, 6, 5, 4 | — | — | — | — | 8, 7, 6, 5, 4 | — | — |
| 5 | — | — | 13, 12, 11, 10, 9, 8, 7, 6, 5, 4 | — | — | — | — | — | — | —, | wherein the k is any one element of a set K which is defined for the subframe n according to the table 2.

3. The method of claim 1, wherein the UL-DL configuration for the primary cell indicates for each subframe included in the TDD frame whether it is a downlink subframe, a special subframe or an uplink subframe, and
wherein an UL-DL configuration for the secondary cell is determined based on the UL-DL configuration for the primary cell.

4. The method of claim 1, wherein the primary cell is a cell that performs an initial connection establishment process or a connection reestablishment process with a base station.

5. The method of claim 1, wherein the downlink subframe and the uplink subframe are located at different times in the TDD frame, and the consecutive downlink subframes and the consecutive uplink subframes are located on two different frequencies, respectively.

6. A user equipment (UE) for performing hybrid automatic repeat and request (HARQ) process in a carrier aggregation system, the UE comprising:
a transceiver that transmits and receives a radio signal; and
a processor operationally connected with the transceiver, wherein the processor receives data through a physical downlink shared channel (PDSCH) in a subframe n-k of a secondary cell and transmits ACK/NACK information for the data through a physical uplink control channel (PUCCH) in a subframe n of a primary cell,
wherein n, k are integers,
wherein the primary cell uses a time division duplex (TDD) frame and the secondary cell uses a frequency division duplex (FDD) frame,
wherein a combination of a downlink subframe and an uplink subframe included in the TDD frame is determined by a UL-DL configuration for the primary cell, and
wherein the FDD frame includes consecutive downlink subframes and consecutive uplink subframes.

7. The UE of claim 6, wherein when the UL-DL configuration for the primary cell is one of UL-DL configurations included in a below table 1, wherein D denotes a downlink subframe, S denotes a special subframe and U denotes an uplink subframe:

TABLE 1

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 2 | D | S | U | D | D | D | S | U | D | D |
| 5 | D | S | U | D | D | D | D | D | D | D, | the subframe n and the k are configured according to a below table 2,

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 2 | — | — | 8, 7, 6, 5, 4 | — | — | — | — | 8, 7, 6, 5, 4 | — | — |
| 5 | — | — | 13, 12, 11, 10, 9, 8, 7, 6, 5, 4 | — | — | — | — | — | — | —, | wherein the k is any one element of a set K which is defined for the subframe n according to the table 2.

8. The UE of claim 6, wherein the UL-DL configuration for the primary cell indicates for each subframe included in the TDD frame whether it is a downlink subframe, a special subframe or an uplink subframe, and
wherein an UL-DL configuration for the secondary cell is determined based on the UL-DL configuration for the primary cell.

9. The UE of claim 6, wherein the primary cell is a cell that performs an initial connection establishment process or a connection reestablishment process with a base station.

10. The UE of claim 6, wherein the downlink subframe and the uplink subframe are located at different times in the TDD frame, and the consecutive downlink subframes and the consecutive uplink subframes are located on two different frequencies, respectively.

* * * * *